United States Patent
Klang et al.

(10) Patent No.: US 10,329,449 B2
(45) Date of Patent: Jun. 25, 2019

(54) SOLVENT-FREE AQUEOUS POLYURETHANE DISPERSIONS AND METHODS OF PRODUCING SOLVENT-FREE AQUEOUS POLYURETHANE DISPERSIONS

(71) Applicant: Arkema France, Colombes (FR)

(72) Inventors: Jeffrey A. Klang, West Chester, PA (US); Jin Lu, West Chester, PA (US); Indu Vappala, Exton, PA (US)

(73) Assignee: ARKEMA FRANCE, Colombes (FR)

( * ) Notice: Subject to any disclaimer, the term of this patent is extended or adjusted under 35 U.S.C. 154(b) by 238 days.

(21) Appl. No.: 15/038,079

(22) PCT Filed: Nov. 21, 2014

(86) PCT No.: PCT/EP2014/075313
§ 371 (c)(1),
(2) Date: May 20, 2016

(87) PCT Pub. No.: WO2015/075193
PCT Pub. Date: May 28, 2015

(65) Prior Publication Data
US 2016/0304742 A1    Oct. 20, 2016

Related U.S. Application Data

(60) Provisional application No. 61/986,165, filed on Apr. 30, 2014, provisional application No. 61/907,434, filed on Nov. 22, 2013.

(51) Int. Cl.
| | | |
|---|---|---|
| C09D 175/06 | (2006.01) | |
| C08G 18/67 | (2006.01) | |
| C08G 18/75 | (2006.01) | |
| C08G 18/08 | (2006.01) | |
| C08G 18/12 | (2006.01) | |
| C09D 175/16 | (2006.01) | |

(Continued)

(52) U.S. Cl.
CPC ....... *C09D 175/06* (2013.01); *C08G 18/0838* (2013.01); *C08G 18/12* (2013.01); *C08G 18/4238* (2013.01); *C08G 18/44* (2013.01); *C08G 18/673* (2013.01); *C08G 18/755* (2013.01); *C09D 175/16* (2013.01)

(58) Field of Classification Search
None
See application file for complete search history.

(56) References Cited

U.S. PATENT DOCUMENTS

| | | |
|---|---|---|
| 5,596,065 A | 1/1997 | Gerlitz et al. |
| 2003/0055171 A1 | 3/2003 | Overbeek et al. |

(Continued)

FOREIGN PATENT DOCUMENTS

| | | |
|---|---|---|
| WO | WO 2012/089538 A1 | 7/2012 |
| WO | WO 2012/126911 A1 | 9/2012 |

*Primary Examiner* — Shamim Ahmed
*Assistant Examiner* — Bradford M Gates
(74) *Attorney, Agent, or Firm* — Christopher Lewis

(57) ABSTRACT

A solvent-free aqueous curable polyurethane dispersion is derived from at least one isocyanate-terminated ethylenically unsaturated polyurethane pre-polymer in a reactive diluent. The polyurethane pre-polymer comprises at least one (meth)acrylate functional group and at least one isocyanate functional group. Methods for making a solvent-free aqueous polyurethane dispersion, curable compositions comprising the dispersion and resulting cured products are also disclosed.

25 Claims, 1 Drawing Sheet

(51) Int. Cl.
*C08G 18/42* (2006.01)
*C08G 18/44* (2006.01)

(56) References Cited

U.S. PATENT DOCUMENTS

| | | |
|---|---|---|
| 2004/0254293 A1 | 12/2004 | Killilea et al. |
| 2005/0192400 A1 | 9/2005 | Killilea et al. |
| 2006/0251896 A1 | 11/2006 | Ferencz et al. |
| 2009/0162564 A1 | 6/2009 | Naderhoff et al. |
| 2010/0119735 A1 | 5/2010 | Faler et al. |
| 2010/0210757 A1 | 8/2010 | Sommer et al. |
| 2012/0041145 A1 | 2/2012 | Sommer et al. |
| 2012/0259065 A1 | 10/2012 | Sommer et al. |
| 2013/0041072 A1 | 2/2013 | Sommer et al. |

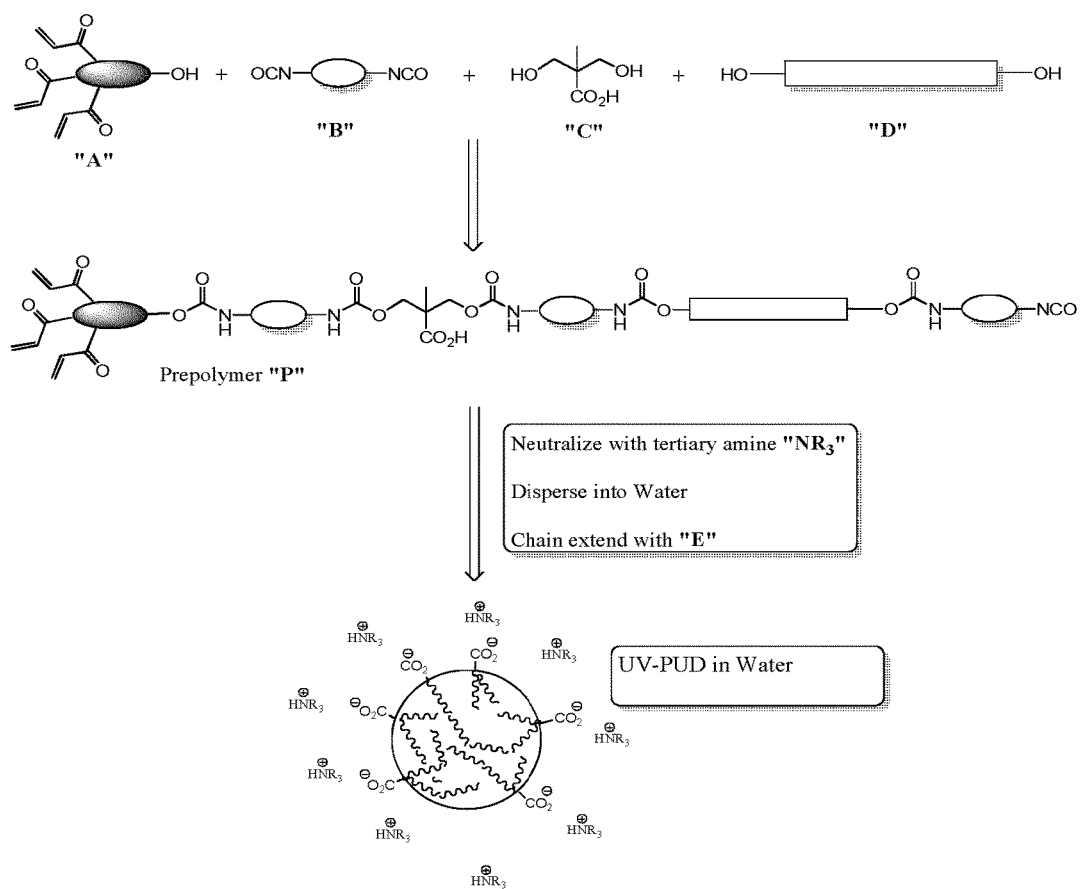

SOLVENT-FREE AQUEOUS POLYURETHANE DISPERSIONS AND METHODS OF PRODUCING SOLVENT-FREE AQUEOUS POLYURETHANE DISPERSIONS

CROSS-REFERENCE TO RELATED APPLICATIONS

This application is a national stage application under 35 U.S.C. § 371 of PCT/EP2014/075313, filed Nov. 21, 2014, which claims benefit to U.S. application Nos. 61/907,434, filed Nov. 22, 2013, and 61/986,165, filed Apr. 30, 2014.

FIELD OF THE INVENTION

The present invention relates to curable aqueous polyurethane dispersions and methods for making said aqueous polyurethane dispersions, curable compositions and finished cured products resulting from. More specifically, the present invention relates to solvent-free aqueous polyurethane dispersions that are curable by actinic radiation.

BACKGROUND OF THE INVENTION

Polyurethane dispersions find many uses in industry. For example, polyurethane dispersions may be used to coat wood, plastic, metal, glass, fibers, textiles, leather, stone, concrete, ceramic or composite and other substrates to provide protection against mechanical, chemical and/or environmental effects. Polyurethane dispersions may also be used for adhesives, sealants, inks and cosmetics and the like.

Polyurethane coatings formed from polyurethane dispersions may be used to provide scratch, abrasion and wear resistance; UV protection; corrosion resistance; glossy or flat appearance; chemical and stain resistance; hydrolytic resistance; flame retardancy; anti-microbial activity; electrical conduction or insulation; barrier or permeability to gasses; adhesion; haptic effects such as soft touch; easy cleaning and anti-fingerprint.

Polyurethane dispersions are typically produced by first forming a polyurethane pre-polymer, which comprises terminal groups, such as isocyanate (NCO) groups, which can undergo subsequent chain extension reactions. To facilitate the formation of the dispersion, the polyurethane pre-polymer is usually diluted with an organic solvent before dispersion in water to lower the viscosity of the pre-polymer. The pre-polymer can undergo a chain-extension reaction prior to or after dispersion in water to increase the length of the polymer chain and/or add additional functionality to the polyurethane.

The use of organic solvents may be undesirable due to volatility, flammability and the difficulty in removing the organic solvents from the polyurethane dispersions. There is also increasing pressure for industrial processes to minimize the use of volatile organic compounds (VOCs). Many VOCs have been linked to environmental issues and may be hazardous to workers exposed to them.

The organic solvent is usually removed after dispersion in water. Distillation is a typical method for removing the organic solvent, but other methods may also be used. Acetone is a common solvent used in the preparation of polyurethane dispersions. Due to cost, acetone is often recycled for repeated use. However, wet acetone, i.e., acetone containing water, cannot be reused in polyurethane production processes. The separation of acetone in the polyurethane production adds cost, complexity and time. Due to the difficulty of removal, at least some acetone is expected to remain in the polyurethane dispersion.

U.S. Patent Application Publication No. 2012/0259065 discloses a process for preparing isocyanate-terminated pre-polymers with low viscosity. The pre-polymers are formed using a specific reaction sequence in which a reaction of NCO-functionalized compounds with OH-functionalized compounds initially takes place in the absence of acid carrying compounds. The isocyanate-terminated pre-polymer is formed in acetone solvent, which is later removed by distillation.

WO 2012/126911 discloses a process for forming polyurethane dispersions which contain polyurethane pre-polymers having a low enough viscosity such that they can be dispersed without the use of solvents or other diluents. However, the process uses hydroxyl terminal groups rather than isocyanate terminal groups, which limit the functionality of the polyurethanes. The pre-polymers are also not acrylated and cannot be UV curable.

Further information is available in U.S. Pat. No. 5,596,065 and publication WO 2012/089538 A1.

SUMMARY OF THE INVENTION

Therefore, it is desirable to provide a process for producing polyurethane dispersions in a solvent-free process. It is also desirable to provide isocyanate terminated polyurethane pre-polymers to provide functional flexibility to the formed polyurethane dispersions.

The present invention relates to aqueous curable polyurethane dispersions and methods of producing aqueous curable polyurethane dispersions, the resulting curable compositions and finished cured products.

One aspect of the present invention relates to an aqueous curable polyurethane dispersion free of non-reactive solvent, preferably radiation-curable and more preferably actinic radiation-curable polyurethane dispersion, said dispersion comprising a polyurethane polymer in at least one reactive diluent (F), wherein the said polyurethane polymer, in particular bearing ethylenic unsaturation end-groups and optionally side groups (ethylenic unsaturation) is formed by chain extending at least one isocyanate-terminated ethylenically unsaturated polyurethane pre-polymer (P), in particular with at least one chain extender (E) bearing at least 2 isocyanate-reactive groups, wherein said pre-polymer (P) is formed by reacting:

(A) one or more isocyanate reactive components containing at least one ethylenic unsaturation, preferably chosen from active hydrogen-containing (meth)acrylates;

(B) one or more di- or polyisocyanates, preferably diisocyanates;

(C) one or more isocyanate reactive components containing ionic groups, potentially ionic groups, meaning precursor of ionic groups or hydrophilic ether groups, preferably ionic groups derived from acidic groups, in particular with said component (C) bearing two isocyanate reactive groups, more particularly bearing two OH groups; and (D) optionally, one or more isocyanate reactive components other than component (A) or component (C), preferably bearing two isocyanate-reactive groups, in particular OH groups, such that the mole ratios of components (A), (B), (C) and (D) result in a polyurethane pre-polymer comprising terminal isocyanate groups.

Another aspect of the present invention relates to a method for producing an aqueous curable polyurethane dispersion free of non-reactive solvent, comprising:

i) reacting in at least one reactive diluent (F) to form a polyurethane pre-polymer (P):
   (A) one or more isocyanate reactive components containing at least one ethylenic unsaturation, preferably chosen from active hydrogen-containing (meth)acrylates;
   (B) one or more di- or polyisocyanates, preferably diisocyanates;
   (C) one or more isocyanate reactive components containing ionic groups, potentially ionic groups or hydrophilic ether groups, preferably ionic groups derived from acidic groups, in particular with said component (C) bearing two isocyanate reactive groups, more particularly bearing two OH groups; and
   (D) optionally, one or more isocyanate reactive components other than component (A) or component (C), preferably bearing two isocyanate reactive groups, in particular OH groups, such that the mole ratios of components (A), (B), (C), and (D) result in a polyurethane pre-polymer comprising terminal isocyanate groups;
ii) dispersing the polyurethane pre-polymer (P) in water; and
iii) reacting isocyanate groups of the polyurethane pre-polymer (P) with a chain extender (E) bearing at least two isocyanate reactive groups to form said polyurethane polymer aqueous dispersion.

Yet another aspect of the present invention relates to a curable composition, in particular to a radiation curable composition, more particularly to an actinic radiation curable composition, preferably coating composition, comprising as a reactive binder said aqueous polyurethane dispersion free of non-reactive solvents.

Another aspect of the present invention relates to a method of coating an object (substrate), such as a wood, metal, plastic or ceramic object, comprising coating said object with an aqueous curable polyurethane dispersion according to the present invention.

Yet another aspect of the present invention relates to the use of an aqueous polyurethane dispersion free of non-reactive solvent, as a reactive binder in a curable composition, preferably for coatings, adhesives, sealants, inks and cosmetics, in particular said curable composition being a coating composition for coating a substrate chosen preferably from wood, plastic, metal, glass, fibers, textiles, leather, stone, concrete, ceramic or a composite. Coatings as finished product mentioned in the present invention should mean varnishes or paints. Cosmetics should mean finished product for cosmetics, like cosmetic coatings.

Another aspect of the present invention relates to a composition comprising at least one isocyanate-terminated ethylenically unsaturated polyurethane pre-polymer and at least one reactive diluent, wherein the polyurethane pre-polymer comprises at least one (meth)acrylate functional group and at least one isocyanate functional group, wherein the composition is free of non-reactive solvents and it is in the form of an aqueous curable dispersion as an intermediate product for obtaining the said polyurethane polymer aqueous dispersion as disclosed according to the present invention.

BRIEF DESCRIPTION OF THE DRAWING

FIG. 1 is a schematic of a particular synthesis process for forming a UV-curable polyurethane dispersion.

DETAILED DESCRIPTION OF THE INVENTION

The first subject of the present invention relates to an aqueous curable polyurethane dispersion free of non-reactive solvent, preferably radiation-curable and more preferably actinic radiation-curable polyurethane dispersion, said dispersion comprising a polyurethane polymer in at least one reactive diluent (F), wherein the polyurethane polymer, in particular bearing ethylenic unsaturation end-groups and optionally side groups (ethylenic unsaturation), is formed by chain extending at least one isocyanate-terminated ethylenically unsaturated polyurethane pre-polymer (P), in particular with at least one chain extender (E) bearing at least 2 isocyanate-reactive groups, wherein said pre-polymer (P) is formed by reacting:
(A) one or more isocyanate reactive components containing at least one ethylenic unsaturation, preferably chosen from active hydrogen-containing (meth)acrylates;
(B) one or more di- or polyisocyanates, preferably diisocyanates;
(C) one or more isocyanate reactive components containing ionic groups, potentially ionic groups, meaning precursor of ionic groups or hydrophilic ether groups, preferably ionic groups derived from acidic groups, in particular with said component (C) bearing two isocyanate reactive groups, more particularly bearing two OH groups; and
(D) optionally, one or more isocyanate reactive components other than component (A) or component (C), preferably bearing two OH groups, such that the mole ratios of components (A), (B), (C) and (D) result in a polyurethane pre-polymer comprising terminal isocyanate groups.

More particularly, the said dispersion according to the present invention is a radiation curable dispersion, preferably an actinic radiation curable dispersion, more preferably the actinic radiation being: UV, LED, laser, visible light (sunlight) radiation.

According to a more specific option of the invention, said component (A) is a polyol component comprising (A1) a monoalcohol bearing at least 1, preferably from 1 to 5 (meth)acrylates groups and optionally (A2) a diol bearing at least 1, preferably from 1 to 4 (meth)acrylate groups.

Component (A) containing ethylenic unsaturation may be chosen from polyester (meth)acrylates, epoxy (meth)acrylates, polyether (meth)acrylates, urethane (meth)acrylates, hydroxy-bearing (meth)acrylates which in fact are partial (meth)acrylic esters of alkylene polyols which may be alkoxylated or partial (meth)acrylic esters of polyols resulting from di-polyol ethers of said alkylene polyols and combinations thereof. As convenient examples of di-polyol ethers, we may cite di-trimethylol (diTMP) ether polyol (tetrol) or di-pentaerhythritol (diPE) ether polyol (hexol: 6 OH). Said alkylene polyols or polyols corresponding to di-alkylene polyol ethers can have from 2 to 6 hydroxy groups.

According to a preferred embodiment, said component (C) is a diol bearing an ionic group resulting from an acidic group chosen from carboxylic, sulfonic, phosphonic or phosphinic groups, preferably carboxylic or sulfonic groups, with said group being at least partly neutralized with a basic agent.

In particular, said component (D) may be a mono- or polyol, monomeric or oligomeric and preferably is a diol. More particularly, said component (D) is oligomeric such as polyether or polyester diol.

In the said polyurethane dispersion of the invention for obtaining the final polyurethane polymer, the said polyurethane pre-polymer is further reacted with a component (E), comprising at least two isocyanate reactive groups, preferably selected from polyols and/or polyamines, more preferably from diols and/or diamines, even more preferably from diamines.

As it concerns the said reactive diluent (F), it may represent from about 10% to about 90%, preferably from 10 to 50% by weight relative to the solids content of the dispersion.

One aspect of the present disclosure relates to a composition free of non-reactive solvents comprising a polyurethane pre-polymer, precursor of said polyurethane final polymer of the dispersion and a reactive diluent.

Another objet of the invention is a process or a method for producing said aqueous polyurethane dispersion free of non-reactive solvent, as defined according to the invention disclosed above, said method comprising:
i) reacting in at least one reactive diluent (F) to form a polyurethane pre-polymer (P):
   (A) one or more isocyanate reactive components containing at least one ethylenic unsaturation chosen from active hydrogen-containing (meth)acrylates;
   (B) one or more polyisocyanates, preferably diisocyanates;
   (C) one or more isocyanate reactive components containing ionic groups, potentially ionic groups or hydrophilic ether groups, preferably ionic groups derived from acidic groups, in particular with said component (C) bearing two isocyanate reactive groups, more particularly two OH groups; and
   (D) optionally, one or more isocyanate reactive components other than component (A) or component (C), preferably bearing two isocyanate reactive groups, in particular OH groups, such that the mole ratios of components (A), (B), (C) and (D) result in a polyurethane pre-polymer comprising terminal isocyanate groups;
ii) dispersing said polyurethane pre-polymer (P) in water; and
iii) reacting isocyanate groups of the polyurethane pre-polymer (P) with a chain extender (E) bearing at least two isocyanate-reactive groups to form said polyurethane polymer aqueous dispersion.

According to a specific option of said method, the said component (C) is a diol bearing an ionic group resulting from an acidic group chosen from carboxylic, sulfonic, phosphonic or phosphinic groups and said dispersing step ii) comprises neutralizing, at least partly, the said acidic group of said pre-polymer, with a basic agent.

The invention also covers as an intermediate product an aqueous dispersion comprising an isocyanate-terminated ethylenically unsaturated polyurethane pre-polymer, as defined above according to (P) as the intermediate product or as obtained after step ii) by a method as defined just above according to the present invention.

Another subject of the invention relates to an aqueous curable composition, comprising as a reactive binder at least one polyurethane dispersion as defined according the invention or as obtained by a process as disclosed above according to present invention.

Said curable aqueous composition is particularly a radiation-curable composition, preferably an actinic radiation-curable composition. More particularly, said curable composition is a coating composition, preferably for substrates chosen from: wood, plastic, metal, glass, fibers, textiles, leather, stone, concrete, ceramic or a composite.

It is also part of the invention a method of coating a substrate, in particular substrate chosen from wood, plastic, metal, glass, fibers, textiles, leather, stone, ceramic, concrete or a composite, with said method comprising:
i) coating the substrate with the polyurethane dispersion as disclosed above or as obtained by the method as disclosed above according to the present invention;
ii) removing the water and
iii) curing the coating with radiation, preferably with actinic radiation.

Another subject covered by the present invention relates to the use of a polyurethane dispersion as defined according to the invention, as a reactive binder in a curable aqueous composition, preferably for coatings, adhesives, sealants, inks or cosmetics.

More particularly, said use relates to a curable composition which is a coating composition, more preferably for substrates chosen from wood, plastic, metal, glass, fibers, textiles, leather, stone, ceramic, concrete or a composite.

Finally, the invention relates to a finished cured product which results from the use of at least one polyurethane dispersion as defined above or as obtained by a method as defined above according to the present invention, preferably said product being selected from coatings, adhesives, inks, sealants or cosmetics.

As used here, the term "pre-polymer" refers to an ethylenically unsaturated compound that comprises one or more isocyanate terminal groups. The pre-polymer may be reacted with other monomers, oligomers or compounds containing functional groups capable of reacting with the pre-polymer, e.g., in a chain extension reaction.

As used herein, the term "reactive diluent" refers to a compound having two or more ethylenically unsaturated groups that may be used as a diluent in the preparation of the polyurethane pre-polymer and to dilute the polyurethane pre-polymer during the formation of the polyurethane dispersion. It may react by free radical reaction with the acrylate groups on dispersed polyurethane during the actinic radiation curing step. The reactive diluent, when added to the polyurethane pre-polymer, can be used to control the viscosity of the polyurethane pre-polymer.

As used herein, the phrase "free of non-reactive solvent" and variations thereof means that a non-reactive solvent is not present in any amount. The term "non-reactive solvent" refers to solvents or diluents, other than water, which do not form part of the cured polyurethane. Compositions free of non-reactive solvent according to the present disclosure do not include trace amounts of non-reactive solvents which remain in processes which use non-reactive solvents that are subsequently removed by distillation or other processes for removing the non-reactive solvents. The phrase "substantially free of non-reactive solvent" means that trace amounts of non-reactive solvent are present in compositions of the invention, e.g., less than 1%, preferably less than 0.5%, more preferably less than 0.2%, most preferably less than 0.1%, based on the total weight of the composition. More preferably, there is no measurable trace of non-reactive solvent. More particularly, there is 0 content of non-reactive solvent.

In at least one embodiment, the composition comprising a polyurethane pre-polymer and a reactive diluent may be a dispersion, a mixture or a combination of the polyurethane pre-polymer (P) and reactive diluent (F) as defined above.

According to at least one embodiment, the polyurethane pre-polymer may be formed by reacting, in the presence of one or more di- or higher functional (meth)acrylate monomers with optional presence of oligomers, as reactive diluent(s) (F) of the following:
(A) one or more isocyanate reactive ethylenically unsaturated components selected from polyester (meth)acrylates, epoxy (meth)acrylates, polyether (meth)acrylates, urethane (meth)acrylates or hydroxyl group-containing (meaning same as hydroxy-bearing) (meth)acrylates as defined above;
with reactant components (B) and (C) as defined above.

According to at least one embodiment, component (A) may comprise in addition to (meth)acrylate groups additional non-(meth)acrylate free-radical polymerizable functionalities such as allylic or vinylic groups.

In at least one embodiment, component (A) may comprise at least one (meth)acrylate functional group, in particular from 1 to 5 (meth)acrylate groups, more particularly at least 2 or 3 (meth)acrylate groups. Component (A) may comprise for example a monoalcohol (A1) of formula (1) bearing 3 (meth)acrylate groups and optionally (A2) a diol of formula (2) bearing two (meth)acrylate groups, the said formulas as shown below:

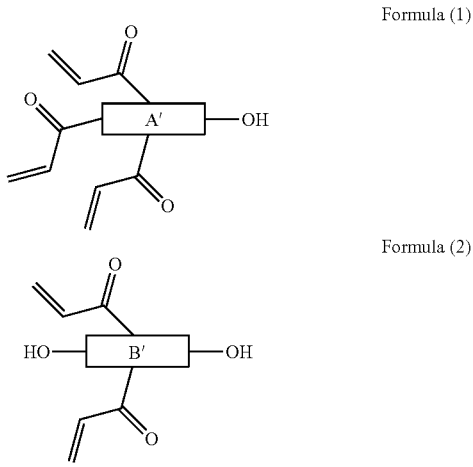

Formula (1)

Formula (2)

wherein A' and B' represent the residues of corresponding polyols (tetrols) partially esterified by acrylic acid and which may be linear, cyclic or branched, substituted or unsubstituted hydrocarbon chains, wherein the optional substituents include cyclic groups and/or heteroatoms. Chains A' and B' may, for example, comprise an ester or ether group.

According to at least one embodiment, component (A) may be monomeric or oligomeric.

Suitable polyester (meth)acrylates include, but are not limited to, the reaction products acrylic or methacrylic acid or mixtures thereof with hydroxyl group terminated polyester polyols where the reaction process is conducted such that a significant concentration of residual hydroxyl groups remain in the polyester (meth)acrylate. The polyester polyols can be di-, tri-, tetra-, penta- or higher in hydroxyl group functionality.

The polyester polyols can be made by polycondensation reactions of di- or higher hydroxyl functional components with di- or higher functionality carboxylic acids or anhydrides. The hydroxyl functional and carboxylic acid components can each have linear, branched, cycloaliphatic or aromatic structures and can be used individually or as mixtures. Examples of suitable di-hydroxyl functional components include: 1,2-ethanediol, 1,2-propanediol, 1,3-propanediol, 1,4-butanediol, 1,5-pentanediol, 1,6-hexanediol, 1,10-decanediol, 1,12-dodecanediol, 1,3-butanediol, 2,2-dimethyl-1,3-propanediol, 2-methyl-1,3-propanediol, diethylene glycol, triethylene glycol, dipropylene glycol, tripropylene glycol, 1,4- and 1,6-dimethylolcylcohexane, $C_{36}$-dimer diol, hydroquinone bis(2-hydroxyethyl) ether (HQEE), hydroxypivaloyl pivalate and ethoxylated and/or propoxylated derivatives of the above. Ethoxylated and/or propoxylated derivatives of bisphenol A or bisphenol F are also suitable. Suitable tri- and higher hydroxyl functional components include: glycerol, trimethylolpropane, trimethylolethane, pentaerythritol, di-glycerol, di-trimethyolpropane, di-pentaerytritol, sorbitol and ethoxylated and/or propoxylated derivatives of the above. Examples of suitable di- or higher functional carboxylic acids include: malonic acid, succinic acid, maleic acid, fumaric acid, itaconic acid, glutaric acid, adipic acid, pimelic acid, sebacic acid, dodecanedioic acid, phthalic acid, isophthalic acid, terephthalic acid, naphthalene dicarboxylic acid, dimer fatty acids, trimellitic acid, pyromellitic acid and the anhydride derivatives of the above. Suitable polyester polyols can also be made by ring opening polymerization of lactones initiated by a hydroxyl functional starter molecule such as those described above. Suitable lactones include $\alpha,\alpha$-dimethyl-$\beta$-propiolactone, $\gamma$-butyrolactone and $\epsilon$-caprolactone.

Examples of epoxy (meth)acrylates include the reaction products of acrylic or methacrylic acid or mixtures thereof with glycidyl ethers or esters. The glycidyl ethers or esters can have aliphatic, cycloaliphatic or aromatic structures and contain from two up to about six epoxy functional groups. Di-epoxy functional materials are preferred. Glycidyl ethers can be prepared from a hydroxyl functional precursor and an epoxy compound such as epichlorohydrin. Many of the hydroxyl functional components listed in the section above are suitable for preparation of aliphatic glycidyl ethers. Specific examples of precursors for aliphatic glycidyl ethers include: 1,4-butanediol, 2,2-dimethyl-1,3-propanediol, 1,6-hexanediol, 1,4- and 1,6-dimethylolcylcohexane, poly(ethylene glycol), poly(propylene glycol), poly(tetramethylene glycol), trimethylolpropane, pentaerythritol, glycerol and sorbitol. Specific examples of precursors for aromatic glycidyl ethers include: bisphenol A, bisphenol F and resorcinol.

Examples of suitable polyether (meth)acrylates include the condensation reaction products of acrylic or methacrylic acid or mixtures thereof with polyetherols which are polyether polyols. Suitable polyetherols can be linear or branched substances containing ether bonds and terminal hydroxyl groups. Polyetherols can be prepared by ring opening polymerization of cyclic ethers such as tetrahydrofuran or alkylene oxides with a starter molecule. Suitable starter molecules include water, the hydroxyl functional materials as described above, polyester polyols and amines. Examples of suitable amines include: ethylene diamine, 4,4'-diaminodiphenylmethane, diethylene triamine and hydroxyl amines such as ethanol amine and diethanol amine. Examples of suitable alkylene oxides include: ethylene oxide, propylene oxide, butylenes oxides, epichlorohydrin and glycidol. The polyether (meth)acrylates can be used individually or in combination.

Examples of polyurethane (meth)acrylates include the polyaddition products of the di- or polyisocyanates described below as component B with isocyanate reactive ethylenically unsaturated components as described in the sections above as polyester-, epoxy- or polyether (meth)acrylates or immediately below as monomeric hydroxyl (meth)acrylates and optionally the isocyanate reactive components described below as component D.

Examples of monomeric hydroxyl (meth)acrylates are acrylic, methacrylic or mixed esters with simple diols, triols, tetrols or polyols where the esterification process is carried out such that residual hydroxyl groups remain in the final product. Examples include (meth)acrylate esters of: 1,2- ethanediol, 1,2-propanediol, 1,3-propanediol, 1,4-butanediol, 1,5-pentanediol, 1,6-hexanediol, 1,10-decanediol, 1,12-dodecanediol, 1,3-butanediol, 2,2-dimethyl-1,3-propanediol, 2-methyl-1,3-propanediol, diethylene glycol, triethylene glycol, dipropylene glycol, tripropylene glycol, 1,4- and 1,6-dimethylolcylcohexane, glycerol, trimethylolpropane, trimethylolethane, pentaerythritol, di-glycerol, di-trimethyolpropane, di-pentaerytritol and sorbitol. The monomeric hydroxyl (meth)acrylates can be used individually or in mixtures. Component (B) may comprise at least two isocyanate functional groups. In at least one embodiment, component (B) may comprise a diisocyanate having two isocyanate functional groups, such as an aliphatic diisocyanate (e.g., isophorone diisocyanate). In other embodiments, component (B) may comprise a plurality of isocyanate groups, such as three or four or more isocyanate groups.

Non-limiting examples of compounds that may comprise component (B) include di- or polyisocyanates such as aliphatic, aromatic and cycloaliphatic structures with at least two isocyanate functional groups per molecule. Examples of suitable isocyanate components include: isophorone diisocyanate, hexamethylene diisocyanate, 2,3,3-trimethyl hexamethylene diisocyanate, 4,4'-dicylcohexylmethane diisocyanate, 1,5-naphthalene diisocyanate, 2,4- or 2,6-toluene diisocyanate and their isomeric mixtures, 4,4'-diphenylmethane diisocyanate. Polyisocyanates formed by creation of isocyanurate or biuret structures are also suitable. Mixtures of isocyanates are also suitable.

Without wishing to be bound by theory, it is believed that component (C) aids in the dispersion of the pre-polymer. Therefore, in at least one embodiment, the composition may not comprise a surfactant. In other embodiments, a surfactant may be added to aid in the dispersion.

In at least one embodiment, component (C) may comprise at least one acid functionality. For example, component (C) may comprise a polyol comprising an acid group selected from carboxylic, sulfonic, phosphoric, phosphonic and phosphinic acid groups. In at least one embodiment, component (C) comprises a diol having a carboxylic or sulfonic acid group.

Examples of component (C) include, but are not limited to, compounds containing at least one and preferably two isocyanate reactive functional groups and at least one polar dispersive group which can be ionic, potentially ionic or polyether in character. Combinations of the different types can be used. Ionic or potentially ionic groups include carboxylic acid, sulfonic acid or phosphoric acid groups or their alkali metal or quaternary amine salts. If the free acid forms are used to prepare the pre-polymer, the acidic groups can be neutralized to the salt form before or during dispersion by addition of a base. Suitable bases include inorganic hydroxides or carbonates and amines and combinations. Specific examples of ionic/potentially ionic components with acidic nature include: hydroxyacetic acid, hydroxypropionic acid, malic acid, citric acid, dimethylolpropionic acid, dimethylolbutanoic acid, 2-sulfo-1,4-butanediol, 2,5-dimethyl-3-sulfo-2,5-hexanediol, 2-aminoethanesulfonic acid, N-(1,1-dimethyl-2-hydroxyethyl)-3-amino-2-hydroxypropanesulfonic acid, 2-aminoethylaminoethanesulfonic acid and salts of the above.

Suitable polyether materials contain at least one isocyanate reactive group and a polyether chain such as those described above as possible precursors to polyether (meth)acrylates.

In accordance with at least one embodiment, the polyurethane pre-polymer may be formed by reacting in the presence of one or more di- or higher functionality (meth) acrylate monomers with optional presence of oligomers, as reactive diluent (F) of the following reactants:
(A) one or more isocyanate reactive ethylenically unsaturated components selected from polyester (meth)acrylates, epoxy (meth)acrylates, polyether (meth)acrylates, urethane (meth)acrylates or hydroxy-bearing (meth)acrylates as defined above;
(B) one or more di- or polyisocyanates;
(C) one or more isocyanate reactive components that also contain ionic groups, potentially ionic groups or hydrophilic ether groups; and
(D) one or more isocyanate reactive components other than component (A) or component (C), such that the mole ratios of components (A), (B), (C) and (D) result in a pre-polymer with isocyanate group termination.

In at least one embodiment, component (D) is chosen from a monol or polyol. According to at least one embodiment, component (D) may be added to increase the molecular weight of the polyurethane pre-polymer, add additional functional groups to the polyurethane pre-polymer or to control the amount of terminal isocyanate groups on the polyurethane pre-polymer.

Examples of component (D) include, but are not limited to, one or more polyols with from one to about six isocyanate reactive groups per molecule and molecular weight from about 200 to 5000 Daltons. Suitable polyols include polyesters, polyethers, polycarbonates, polycaprolactones, polybutadienes, hydrogenated polybutadienes, polyacrylics, polysiloxanes and fluorinated polyethers. Physical mixtures of the above or hybrid polyols with more than one structural type contained in the same molecule can be used.

According to at least one embodiment, component (D) may be monomeric or oligomeric.

When component (D) is used to form the polyurethane pre-polymer, the molar ratios of components (A), (B), (C) and (D) may be selected such that the number of isocyanate groups is in excess of the number of groups reactive with the isocyanate groups. That is, the isocyanate groups are in stoichiometric excess relative to the isocyanate-reactive groups. For example, when the isocyanate-reactive groups are hydroxy groups, the number of isocyanate groups is greater than the number of hydroxy groups. In at least one embodiment, the stoichiometric ratio of isocyanate groups to isocyanate-reactive groups is 1.01 to 3, such as from 1.1 to 2.5 or from 1.2 to 2.

The reaction of pre-polymer (P) as defined above with chain extender (E), in particular bearing two isocyanate reactive groups, more particularly being a diamine, may occur before or after dispersion of the said polyurethane pre-polymer (P) in water for obtaining the final polyurethane polymer of said dispersion according to the present invention.

Non-limiting examples of component (E) include, but are not limited to, compounds selected from diamines, polyamines, primary or secondary amino-terminated polymers and mixtures thereof. Suitable diamines and polyamines can be linear, branched, aliphatic, cycloaliphatic or aromatic. Specific examples include ethylenediamine, 1,2-diaminopropane, 1,3-diaminopropane, 1,4-diaminobutane, 1,6-diaminohexane, 1,10-diaminodecane, 1,11-diamineundecane, 1,12-diaminododecane, dimer diamine, diethylenetriamine, triethylenetetramine, 4-azaheptamethylenediamine, N,N'-bis(3-aminopropyl)butane-1,4-diamine and mixtures thereof. Examples of primary or secondary amino-terminated polymers include polyamides, polyethylenimines, poly(vinylamines) and aminated polyalkylene oxides which are amine-terminated polyethers like JEFFAMINE® commercially available polyamines.

In accordance with at least one embodiment, the reaction to form the polyurethane pre-polymer may also comprise converting any potentially ionic groups into ionic groups by salt formation. For example, in an embodiment where component (C) is dimethyolpropionic acid (DMPA), the hydroxyl groups may react with the isocyanate groups to incorporate the DMPA into the polyurethane chain while leaving the unreacted carboxylic acid group, which is a potentially ionic group. The carboxylic acid can be converted to a salt by addition of a base, such as, for example, an amine or inorganic base such as NaOH, KOH, $NH_4OH$, $NaHCO_3$ or the like.

In at least one embodiment, the reaction mixture for forming the polyurethane pre-polymer may also comprise a catalyst and/or other additives, such as, for example, inhibitors, surfactants, fillers, stabilizers, photoinitiators, pigments, etc.

In accordance with at least one embodiment, the pre-polymer may be dispersed in water.

In at least one embodiment, acid groups formed in the preparation of the polyurethane pre-polymer may be neutralized prior to dispersion.

In at least one embodiment, the polyurethane pre-polymer is formed in the absence of a non-reactive solvent. For example, the polyurethane pre-polymer may be formed in the absence of acetone. This is especially the case when the said pre-polymer (P) is formed in said reactive diluent (F).

According to at least one preferred embodiment, the polyurethane pre-polymer is formed in a reactive diluent. In at least one embodiment, the formed polyurethane pre-polymer may be diluted in additional reactive diluent, which may be the same or different from the initial reactive diluent.

In accordance with at least one embodiment, the reactive diluent comprises or represents up to 90% by weight relative to the solids content of the dispersion. For example, the reactive diluent may comprise about 10% to about 90% by weight relative to the solids content of the dispersion. In other embodiments, the reactive diluent may comprise about 20% to about 80% or from about 25% to about 75% or from about 25% to about 50% by weight relative to the solids content. As one of ordinary skill in the art would recognize, the amount of the reactive diluent may be selected based on the desired viscosity of the dispersion, as well as the desired properties of the resulting polyurethane coating.

The polyurethane pre-polymer formed by the reactions above may be dispersed in water to form an aqueous dispersion.

In at least one embodiment, the polyurethane pre-polymer is diluted with a reactive diluent prior to dispersing the polyurethane pre-polymer in water. By dispersing the polyurethane pre-polymer in water after diluting with the reactive diluent, it may be possible to add a desired amount of the reactive diluent and then disperse the polyurethane pre-polymer and obtain the desired viscosity by adding the water. In accordance with at least one embodiment, the polyurethane pre-polymer may be agitated as it is dispersed in water. In at least one embodiment, reactive diluent, either the same or different reactant diluent if already present, can be added to the aqueous polyurethane dispersion.

The reactive diluent may be selected to provide desired properties of the polyurethane. For example, the reactive diluent may be selected to adjust the properties of the polyurethane, such as the hardness, weatherability, texture, abrasion resistance, flexibility and the like.

In accordance with at least one embodiment, the reactive diluents are materials with two or more ethylenically unsaturated groups, such as, for example, (meth)acrylate groups. The reactive diluents (F) can be monomeric with optional presence of oligomeric ones (in this option in mixture with monomeric) and can be used individually or in combination. When used as reactive diluents rather than as components of the pre-polymer, the hydroxyl group content is not critical. Suitable monomeric examples include the (meth)acrylate esters of 1,2-ethanediol, 1,2-propanediol, 1,3-propanediol, 1,4-butanediol, 1,3-butanediaol, 1,5-pentanediol, 1,6-hexanediol, 1,10-decanediol, 1,12-dodecanediol, 1,3-butanediol, 2,2-dimethyl-1,3-propanediol, 2-methyl-1,3-propanediol, diethylene glycol, triethylene glycol, tetraethylene glycol, dipropylene glycol, tripropylene glycol, 1,4- and 1,6-dimethylolcylcohexane, glycerol, trimethylolpropane, trimethylolethane, pentaerythritol, di-glycerol, di-trimethylolpropane, di-pentaerytritol, sorbitol and alkoxylated derivatives of the above. Many such materials are available commercially from Sartomer as SR-coded products.

Oligomeric reactive diluents, which may be used in mixture with monomeric diluents as disclosed above, include the polyester-, polyether- or urethane (meth)acrylates as described above as components (A) of the pre-polymer, except that, full (meth)acrylic esters without any residual hydroxyl are used as said reactive diluent. Many such products are available commercially from Sartomer as "CN" products and fulfilling the above definition.

The polyurethane pre-polymer is subjected to a chain extension reaction with chain extender (E) to form the final polyurethane polymer of the dispersion according to the invention. The chain extension may further increase the molecular weight of the polyurethane and/or vary the properties of the polyurethane. For example, the chain extender may be selected to alter/adjust the hardness, weatherability, flexibility or adhesiveness. The chain extenders may be selected from polyols and polyamines, such as, for example, diols and diamines. In at least one preferred embodiment, the chain extender (E) is selected from diamines.

The chain extender (E) may comprise two or more functional groups reactive with the isocyanate terminal groups of the polyurethane pre-polymer (P). In at least one embodiment, the chain extender comprises two isocyanate-reactive functional groups and functions to extend the polyurethane. In other embodiments, the chain extender may comprise three or more functional groups and function to both extend the polyurethane chain and form branched structures. In at least one embodiment, a mixture of chain extenders comprising two functional groups and three or more functional groups may be used. Said pre-polymer (P) preferably bears one residual NCO group per chain and consequently there is none possible crosslinking.

In at least one embodiment, a polyurethane dispersion comprising a polyurethane polymer in at least one reactive diluent is prepared by a method wherein the polyurethane polymer is formed by chain extending at least one isocyanate-terminated ethylenically unsaturated polyurethane pre-polymer as described above.

In accordance with at least one embodiment, the chain extension of the polyurethane pre-polymer results in the reaction of substantially all of the terminal isocyanate groups present in the polyurethane pre-polymer.

As used herein, the phrase "substantially all of the terminal isocyanate groups" and variations thereof means that at least 95% of the terminal isocyanate groups are involved in the chain extension reaction, such as for example, at least 98% or at least 99% of the terminal isocyanate groups. More preferably, 100% of the terminal isocyanate groups of said pre-polymer (P) are reacted in the said chain extension reaction with chain extender (E).

In accordance with at least one embodiment, said pre-polymer (P) is dispersed in water prior to the chain extension reaction.

In at least one embodiment, the polyurethane pre-polymer (P) is neutralized before the chain extension reaction.

The polyurethane dispersion is preferably free of non-reactive solvent. According to at least one embodiment, the polyurethane pre-polymer has a number average molecular weight Mn ranging from about 400 to about 15,000 Daltons, such as, for example, from about 700 to about 10,000 Daltons. Following chain extension, the polyurethane polymer may have a number average molecular weight Mn ranging from about 1500 to about 60,000 Daltons, such as, for example, from about 2000 to about 50,000 Daltons. Mn can be determined by GPC measurement in THF using polystyrene standards for calibration.

According to at least one embodiment of the present disclosure, the polyurethane dispersion is radiation curable. In at least one embodiment, the polyurethane dispersion may be cured by exposure to actinic radiation. According to at least one embodiment, the polyurethane dispersion is cured by exposure to ultraviolet light.

In accordance with at least one embodiment, the polyurethane dispersions of the present disclosure may be used to coat objects (substrates), comprising for example, wood, metal, plastic, ceramic, composite, glass, fibers, textiles, leather, stone, concrete. The object may be coated with the polyurethane dispersion, which is subsequently cured.

The polyurethane dispersions of the present disclosure may be used to form coatings that provide protection against mechanical, chemical and/or environmental effects. In other embodiments, the polyurethane dispersions may be used as adhesives, surface modifiers, surface coatings and inks. In other embodiments, the polyurethane dispersions of the present disclosure may be used for cosmetic applications.

In at least one embodiment, the polyurethane dispersions of the present disclosure may be used to form an actinic radiation curable composition.

The polyurethane dispersions of the present disclosure may also be used for adhesives, sealants, inks and other applications, such as providing surface texture or haptic effects.

The polyurethane coatings formed from polyurethane dispersions of the present disclosure may be used to provide scratch, abrasion and wear resistance; UV protection; corrosion resistance; surface appearance, such as a glossy or flat appearance; chemical and stain resistance; hydrolytic resistance; flame retardancy; anti-microbial activity; electrical conduction or insulation; barrier or permeability to gasses; adhesion; haptic effects such as soft touch; easy cleaning and anti-fingerprint. The properties of the resultant polyurethane coatings may be controlled by varying the amounts of the components present within the polyurethane dispersions described above.

In at least one embodiment, the present disclosure relates to a polyurethane aqueous dispersion wherein it is a solvent-free dispersion and comprises a polyurethane polymer bearing (polymerizable) ethylenically unsaturated terminal and optionally pending groups, obtained by reacting components (A), (B), (C) and optionally (D) to form said pre-polymer (P) and then chain extending with chain extender (E), all components (A), (B), (C), (D) and (E) being as defined above according to the present invention and with the following additional specification, where:

A) is an isocyanate reactive component containing ethylenic unsaturation, said component comprising:
  A1) at least one monool (monoalcohol) bearing at least one and preferably at least 2, ethylenically unsaturated groups, more preferably said ethylenically unsaturated group being a (meth)acrylate group,
  A2) at least one diol bearing at least one, preferably at least 2 ethylenically unsaturated groups, more preferably said ethylenically unsaturated group being a (meth)acrylate group,
B) is a polyisocyanate component which comprises at least one polyisocyanate bearing at least 2 isocyanate (NCO) groups, preferably from 2 to 3 and more preferably 2 isocyanate groups;
C) is at least one diol bearing an acid group preferably selected from carboxy, sulfonic, phosphoric, phosponic or phosphinic groups, more preferably carboxy or sulfonic groups, at least partly neutralized by a basic agent,
D) is a saturated polyol, preferably diol different from (A2), which may be monomeric or oligomeric, preferably oligomeric diol, in particular with Mn<1000, more preferably a polyester diol;

with the reaction of (A), (C) and (D) with (B) being under conditions of excess of NCO groups with respect to the total of OH groups of ((A)+(C)+(D)), preferably with NCO/OH (total) ratio being from 1.01 to 3, preferably from 1.1 to 2.5 and more preferably from 1.2 to 2, and the thus resulting NCO-ended pre-polymer (P) being chain extended by additional reaction of NCO terminal groups of said pre-polymer (P) with a chain extender (E) bearing at least 2 isocyanate-reactive groups, said extender (E) preferably being selected from polyols and/or polyamines, more preferably diols and/or diamines, even more preferably from diamines.

According to a preferred option extender, (E) is a diamine and in such a case urea groups are formed by reaction between amine groups of (E) with NCO groups of (P). The acidic groups of said polyurethane polymer incorporated by the reaction of component (C) are at least partially neutralized, preferably completely neutralized by a weak base which may be selected from amines or phosphines, more preferably amines and even more preferably tertiary amines.

Optionally, the said dispersion may comprise at least one surfactant completing the stabilizing effect already provided by component (C) to the aqueous dispersion of the final polyurethane polymer. Such a surfactant may be a non ionic surfactant with the advantage of a stabilizing effect independent of the pH.

According to at least one embodiment, a process of preparing the said aqueous dispersion wherein it is a solvent-free process comprising the following successive steps:
i) preparing a NCO-ended pre-polymer by reacting component (A), (C) and optionally (D) with polyisocyanate component (B) as defined just above;
ii) neutralizing at least partially the said acid groups and optionally adding at least one surfactant;
iii) dispersing the neutralized pre-polymer of step ii) in water under agitation to obtain an aqueous dispersion of said pre-polymer (P); and
iv) adding a chain extender (E) which bears at least two isocyanate-reactive groups in the dispersion of said pre-polymer (P), and
v) optionally, and if needed, adjusting the solids content by dilution or adjusting the pH.

In particular the polyurethane polymer of said polyurethane dispersion is substantially free of terminal isocyanate groups, preferably without any isocyanate groups.

The present disclosure also relates to a radiation-curable composition, wherein it comprises at least one dispersion or a dispersion obtainable by a process as described above, preferably being a coating composition and more preferably a coating composition for wood, plastic, metal, glass, fibers, textiles, leather, stone, concrete, ceramic or composite and even more preferable a wood coating composition.

The present disclosure also relates to an actinic radiation-curable composition, wherein it comprises at least one dispersion or a dispersion as obtainable by a process, as described above.

The present disclosure also relates to a coating, in particular wood coating, wherein is derived from the said aqueous dispersion as described above. In other embodiments, the coating may be applied to plastic, metal, glass, fibers, textiles, leather, stone, concrete, ceramic or composite or other substrates.

In the description of the embodiments and examples herein, the transitional phrase "comprising" has been used. However, the invention is also understood to include embodiments consisting of and consisting essentially of the components described for each embodiment. As used herein, the phrase "consisting essentially of" excludes components that would react with the polyurethane pre-polymer or reactive diluent, but includes components such as dyes, surfactants, etc., which do not react with the polyurethane pre-polymer or reactive diluent.

EXAMPLES

Example 1: Preparation of Pre-Polymer and a UV-Curable Polyurethane Dispersion (UV-PUD)

Pre-Polymer:

A reaction vessel suitable for polyurethane preparation was charged with dimethylolpropionic acid (11.9 g), Irganoxx 1035 (0.6 g), dibutyltin dilaurate (0.4 g) and ethoxylated trimethylolpropane triacrylate (Sartomer SR454, 200 g) and the mixture heated to 45° C. with agitation. Isophorone diisocyanate (91.1 g) was added over 30 minutes while increasing the temperature to 70° C. The reaction was held at 70° C. until the % NCO by titration was constant. A 1000 Mw polycarbonate diol (Oxymer® M112; 51.7 g), an epoxy acrylate (Sartomer CN104; 26.8 g) and an acrylated di-trimethylolpropane (diTMP) with OH value of 163 mg KOH/g (17.6 g) were then added. Reaction was continued at 70° C. until the % NCO by titration was less than 3.5%.

Neutralization, Dispersion and Chain Extension:

After cooling to 60° C., triethylamine (9 g) was added and after 15 minutes the agitation rate was increased and deionized water (50 g) was added all at once. After 15 minutes, ethylenediamine (8 g) dissolved in deionized water (82 g) was added and agitation was continued for 60 minutes. After filtration through a 100 micron bag filter, the final dispersion had the following properties: wt % solids=40.3, viscosity at 25° C.=8 mPa·s (8 cP), average particle size=100 nm and pH=7.25.

Example 2: Preparation of Pre-Polymer and a UV-Curable Polyurethane Dispersion (UV-PUD)

Pre-Polymer:

A reaction vessel suitable for polyurethane preparation was charged with dimethylolpropionic acid (12 g), Irganox® 1035 (0.6 g), dibutyltin dilaurate (0.4 g), ethoxylated trimethylolpropane triacrylate (Sartomer SR454, 161 g) and dipentaerythritol hexaacrylate (Sartomer SR399, 40 g) and the mixture heated to 45° C. with agitation. Isophorone diisocyanate (100 gm) was added over 30 minutes while increasing the temperature to 70° C. The reaction was held at 70° C. until the % NCO by titration was constant. A 500 Mw NPG-adipate polyester polyol (35.1 g), an epoxy acrylate (Sartomer CN104; 36.4 g) and an acrylated di-trimethylolpropane (diTMP) with OH value of 163 mg KOH/g (16 g) were then added. Reaction was continued at 70° C. until the % NCO by titration was less than 3.5%.

Neutralization, Dispersion and Chain Extension:

After cooling to 60° C., triethylamine (9 g) was added and after 15 minutes the agitation rate was increased and deionized water (52.4 g) was added all at once. After 15 minutes, ethylenediamine (8 g) dissolved in deionized water (55 g) was added and agitation was continued for 60 minutes. After filtration through a 100 micron bag filter, the final dispersion had the following properties: wt % solids=41, viscosity at 25° C.=8 mPa·s (8 cP), average particle size=130 nm and pH=7.5.

Example 3: Formulation, Curing and Testing of UV-PUDs

Formulation:

The subject UV-PUD was diluted to 35% solids with deionized water and the following components were added in the order listed while mixing: 1.75 wt % Irgacure® 500 (photoinitiator, product of BASF), 0.175 wt % BYK® 346 (flow and leveling agent, product of BYK Chemie) and 0.35% Coapur® 975W (thickener, product of Coatex). After addition was complete, agitation was continued for another 30 minutes and the formulation was allowed to stand for several hours to allow de-aeration.

Coating and Curing:

Using a drawdown bar, the formulation was applied at 6 mil (152μ) wet film thickness to a substrate appropriate for the test being run as noted below. The applied coating was dried at room temperature for 10 minutes and then at 60° C. for 10 minutes and then UV cured using a 300 W/in (118.1 W/cm) Hg lamp at 30 ft/min (9.14 m/min).

TABLE 1

Test results

| Property | UV-PUD of Example 1 | UV-PUD of Example 2 |
|---|---|---|
| Koenig Hardness (sec) | 150 | 165 |
| Stain Resistance Rating | 0.5 | 0.5 |
| Water Resistance | 0 | 0 |
| MEK Resistance (double rubs) | 200+ | 200+ |
| Taber Abrasion (weight loss after 1000 cycles) | 50 mg | 35 mg |
| Tensile Strength (psi/(MPa)) | 5000 (34.5) | 4500 (31.0) |
| Elongation (%) | 3.9 | 2.9 |

Koenig Hardness was tested on glass substrate according to ASTM D4366-9.

Stain resistance was tested on white or black Lenetta charts. Staining materials evaluated were mustard, ketchup, coffee, olive oil and 100 proof alcohol. A drop of stain material was applied to the coated substrate, covered with a small beaker and allowed to stand for 20 hrs except mustard which was let stand for 1 hr. At the end of the exposure period, the stain material was wiped away, visually examined and a rating of 0 (no visible stain) to 5 (severe staining)

was assigned. The rating reported in Table 1 is the sum of the ratings for the five stain materials. This method was adapted from the KCMA/ANSI A161.1-2012 Chemical Resistance test method.

Water resistance was tested on a black Lenetta chart. A drop of 70° C. water was applied, covered with an insulating foam cup and let stand for 20 hours. After wiping away the water, the spot was observed for whitening and ranked as above.

MEK Resistance was tested on aluminum panels according to ASTM D5402-06 using MEK solvent and a 2 lb (8.9 N) load. The test was continued until breakthrough or up to a maximum of 200 double rubs.

Taber abrasion was tested on chromated aluminum plaques according to ASTM D4060-10 using a CS-17 wheel under a 1 kg load (9.81 N).

Free film specimens for tensile testing were prepared by curing a film on glass and then cutting into ½" (1.27 cm)×approximately 3" (7.62 cm) strips which where then carefully removed from the glass. Tensile properties were tested according to ASTM D880.

The invention claimed is:

1. An aqueous curable polyurethane dispersion, comprising a polyurethane polymer in at least one reactive diluent (F), wherein said polyurethane polymer is formed by chain extending at least one isocyanate-terminated ethylenically unsaturated polyurethane pre-polymer (P), with at least one chain extender (E) bearing at least 2 isocyanate-reactive groups, wherein said pre-polymer is formed by reacting:
   (A) one or more isocyanate reactive components comprising (A1) a monoalcohol of formula (1) below bearing 3 (meth)acrylate groups and (A2) a diol of formula (2) below bearing 2 (meth)acrylate groups Formula (1)
   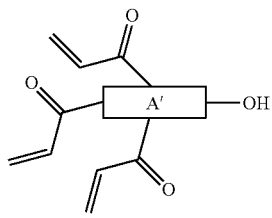

Formula (2)
   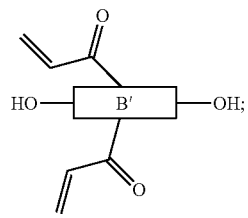

(B) one or more polyisocyanates;
   (C) one or more isocyanate reactive components containing ionic groups, potentially ionic groups or hydrophilic ether groups with said component (C) bearing two isocyanate reactive groups; and
   (D) optionally, one or more isocyanate reactive components other than component (A) or component (C), bearing two isocyanate reactive groups, such that the mole ratios of components (A), (B), (C) and (D) result in a polyurethane pre-polymer comprising terminal isocyanate groups,
   when A' and B' represent the residues of corresponding polyols (tetrols) partially esterified by acrylic acid and which may be linear, cyclic, or branched, substituted or unsubstituted hydrocarbon chains, the optional substituents including cyclic groups, heteroatoms or both and wherein the polyurethane dispersion is free of non-reactive solvent.

2. The polyurethane dispersion of claim 1, wherein the polyurethane dispersion is a radiation curable dispersion.

3. The polyurethane dispersion of claim 2, wherein the polyurethane dispersion is an actinic radiation curable dispersion.

4. The polyurethane dispersion of claim 3, wherein said actinic radiation is: UV, LED, laser, or visible light radiation.

5. The polyurethane dispersion of claim 1, wherein the polyurethane polymer is substantially free of terminal isocyanate groups.

6. The polyurethane dispersion of claim 1, wherein said component (C) is a diol bearing an ionic group resulting from an acidic group chosen from carboxylic, sulfonic, phosphonic or phosphinic groups, with said group being at least partly neutralized with a basic agent.

7. The polyurethane dispersion of claim 1, wherein the polyurethane pre-polymer is further reacted with a component (E), comprising at least two isocyanate reactive groups.

8. The polyurethane dispersion of claim 7, wherein said component (E) comprising at least two isocyanate reactive groups is selected from diamines.

9. The polyurethane dispersion of claim 1, wherein said reactive diluent (F) represents from about 10% to about 90% by weight relative to the solids content of the dispersion.

10. The polyurethane dispersion of claim 9, wherein said diluent (F) represents from 10 to 50% by weight relative to the solids content of the dispersion.

11. The polyurethane dispersion of claim 1, wherein said polyurethane polymer bears ethylenic unsaturation end-groups and optionally side-groups.

12. The polyurethane dispersion of claim 1, wherein said polyisocyanate (B) is a diisocyanate.

13. The polyurethane dispersion of claim 1, wherein said one or more isocyanate reactive components contain said ionic groups and said ionic groups of component (C) is derived from acidic groups.

14. The polyurethane dispersion of claim 1, wherein said component (C) bears two OH groups.

15. The polyurethane dispersion of claim 1, wherein optional component (D) is present and said component (D) bears two OH groups.

16. A curable aqueous composition comprising as a reactive binder at least one polyurethane dispersion as defined according to claim 1.

17. The curable aqueous composition of claim 16, wherein the composition is a radiation curable composition.

18. The curable composition of claim 16, wherein the composition is a coating composition for substrates selected from the group consisting of wood, plastic, metal, glass, fibers, textiles, leather, stone, concrete, ceramic and a composite.

19. The curable composition of claim 17, wherein the composition is an actinic radiation curable composition.

20. A method of coating a substrate selected from the group consisting of wood, plastic, metal, glass, fibers, textiles, leather, stone, ceramic, concrete and a composite, with said method comprising:
   i) coating the substrate with the polyurethane dispersion as defined according to claim 1;
   ii) removing the water and
   iii) curing the coating with radiation.

21. A cured product, wherein the cured product results from the use of at least one polyurethane dispersion as defined according to claim 1.

22. The cured product of claim 21, wherein the cured product is selected from the group consisting of coatings, adhesives, inks, sealants and cosmetics.

23. A method for producing an aqueous polyurethane dispersion, said method comprising:
  i) reacting in at least one reactive diluent (F) to form a polyurethane pre-polymer (P):
    (A) one or more isocyanate reactive components comprising: (A1) a monoalcohol of formula (1) below bearing 3 (meth)acrylate groups and (A2) a diol of formula (2) below bearing 2 (meth)acrylate groups

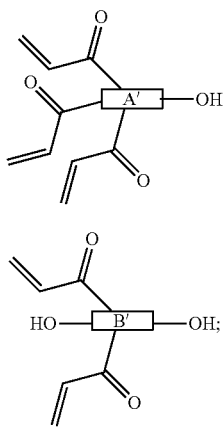

Formula (1)

Formula (2)

(B) one or more di- or polyisocyanates:
    (C) one or more isocyanate reactive components containing ionic groups, potentially ionic groups or hydrophilic ether groups, with said component (C) bearing two isocyanate reactive groups; and
    (D) optionally, one or more isocyanate reactive components other than component (A) or component (C), bearing two isocyanate reactive groups, such that the mole ratios of components (A), (B), (C) and (D) result in a polyurethane pre-polymer comprising terminal isocyanate groups;
  ii) dispersing said polyurethane pre-polymer (P) in water; and
  iii) reacting isocyanate groups of the polyurethane pre-polymer (P) with a chain extender (F) bearing at least two isocyanate-reactive groups to form a polyurethane polymer aqueous dispersion
    wherein A' and B' represent the residues of corresponding polyols (tetrols) partially esterified by acrylic acid and which may be linear, cyclic, or branched, substituted or unsubstituted hydrocarbon chains, the optional substituents including cyclic groups, heteroatoms or both and wherein the polyurethane dispersion is free of non-reactive solvent.

24. The method of claim 23, wherein the said component (C) is a diol bearing an ionic group resulting from an acidic group chosen from carboxylic, sulfonic, phosphonic or phosphinic groups and wherein said dispersing step ii) comprises neutralizing, at least partly, said acidic group of said pre-polymer, with a basic agent.

25. An aqueous dispersion comprising an isocyanate-terminated ethylenically unsaturated polyurethane pre-polymer formed by reacting:
  (A) one or more isocyanate reactive components comprising: (A1) a monoalcohol of formula (1) below bearing 3 (meth)acrylate groups and (A2) a diol of formula (2) below bearing 2 (meth)acrylate groups

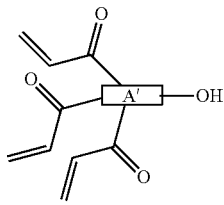

Formula (1)

Formula (2)

(B) one or more polyisocyanates;
  (C) one or more isocyanate reactive components containing ionic groups, potentially ionic groups or hydrophilic ether groups with said component (C) bearing two isocyanate reactive groups; and
  (D) optionally, one or more isocyanate reactive components other than component (A) or component (C), bearing two isocyanate reactive groups, such that the mole ratios of components (A), (B), (C) and (D) result in a polyurethane pre-polymer comprising terminal isocyanate groups
    wherein A' and B' represent the residues of corresponding polyols (tetrols) partially esterified by acrylic acid and which may be linear, cyclic, or branched, substituted or unsubstituted hydrocarbon chains, the optional substituents including cyclic groups, heteroatoms or both and wherein the polyurethane dispersion is free of non-reactive solvent.

* * * * *